United States Patent
Koefele

(10) Patent No.: US 9,316,281 B2
(45) Date of Patent: Apr. 19, 2016

(54) REFRIGERATOR UNIT AND/OR FREEZER UNIT

(71) Applicant: Liebherr-Hausgerate Lienz GmbH, Lienz (AT)

(72) Inventor: Markus Koefele, Hopfgarten (AT)

(73) Assignee: LIEBHERR-HAUSGERATE LIENZ GMBH (AT)

( * ) Notice: Subject to any disclaimer, the term of this patent is extended or adjusted under 35 U.S.C. 154(b) by 425 days.

(21) Appl. No.: 13/748,005

(22) Filed: Jan. 23, 2013

(65) Prior Publication Data

US 2013/0186112 A1 Jul. 25, 2013

(30) Foreign Application Priority Data

Jan. 24, 2012 (DE) .......................... 10 2012 001 344
Feb. 16, 2012 (DE) .......................... 10 2012 003 147

(51) Int. Cl.
*F25B 39/04* (2006.01)
*F16F 7/00* (2006.01)
*F25D 23/00* (2006.01)

(52) U.S. Cl.
CPC ................ *F16F 7/00* (2013.01); *F25D 23/006* (2013.01); *F25B 39/04* (2013.01); *Y10T 29/49826* (2015.01)

(58) Field of Classification Search
CPC ............. F25B 2500/12; F25B 2500/13; F25D 23/006; F24F 13/24; F28F 9/001; F28F 2265/30; B60H 1/00521; Y10S 165/071
USPC .............................................. 62/195; 165/69
See application file for complete search history.

(56) References Cited

U.S. PATENT DOCUMENTS

| 2,161,667 | A | | 6/1939 | Des Roches |
| 2,236,111 | A | | 3/1941 | Philipp |
| 3,785,168 | A | * | 1/1974 | Domingorene ................. 62/455 |
| 4,914,929 | A | * | 4/1990 | Shimazaki ......... B60H 1/00521 165/69 |
| 5,428,973 | A | | 7/1995 | Temmyo et al. |
| 5,632,328 | A | * | 5/1997 | Sawyer et al. .................. 165/69 |
| 5,736,059 | A | * | 4/1998 | Mackelvie ............ F24D 17/001 165/47 |
| 6,119,463 | A | * | 9/2000 | Bell .................... B60H 1/00471 165/86 |
| 2009/0205891 | A1 | * | 8/2009 | Parrett et al. ................. 180/68.1 |

FOREIGN PATENT DOCUMENTS

| DE | 69825616 T2 | 9/2005 |
| JP | 48028154 U | 4/1973 |
| JP | 2503755 B2 | 6/1996 |
| JP | 0931889 A | 12/1997 |
| JP | 11270955 A | 10/1999 |

(Continued)

OTHER PUBLICATIONS

German Search Report dated Jul. 19, 2012; 5 pages.

*Primary Examiner* — Cassey D Bauer
(74) *Attorney, Agent, or Firm* — Carter, DeLuca, Farrell & Schmidt, LLP

(57) ABSTRACT

The present invention relates to a refrigerator unit and/or freezer unit having at least one coolant circuit which has at least one condenser which is connected to at least one damping element which damps vibrations of the condenser and which is arranged between the condenser and at least one part of the unit, wherein the damping element consists of or comprises in part or in full a foamed and/or expanded material, preferably foam, in particular PP or PE, and/or an expanded polymer material, and in particular expanded polypropylene (EPP).

11 Claims, 5 Drawing Sheets

(56) References Cited

FOREIGN PATENT DOCUMENTS

Figure 1:
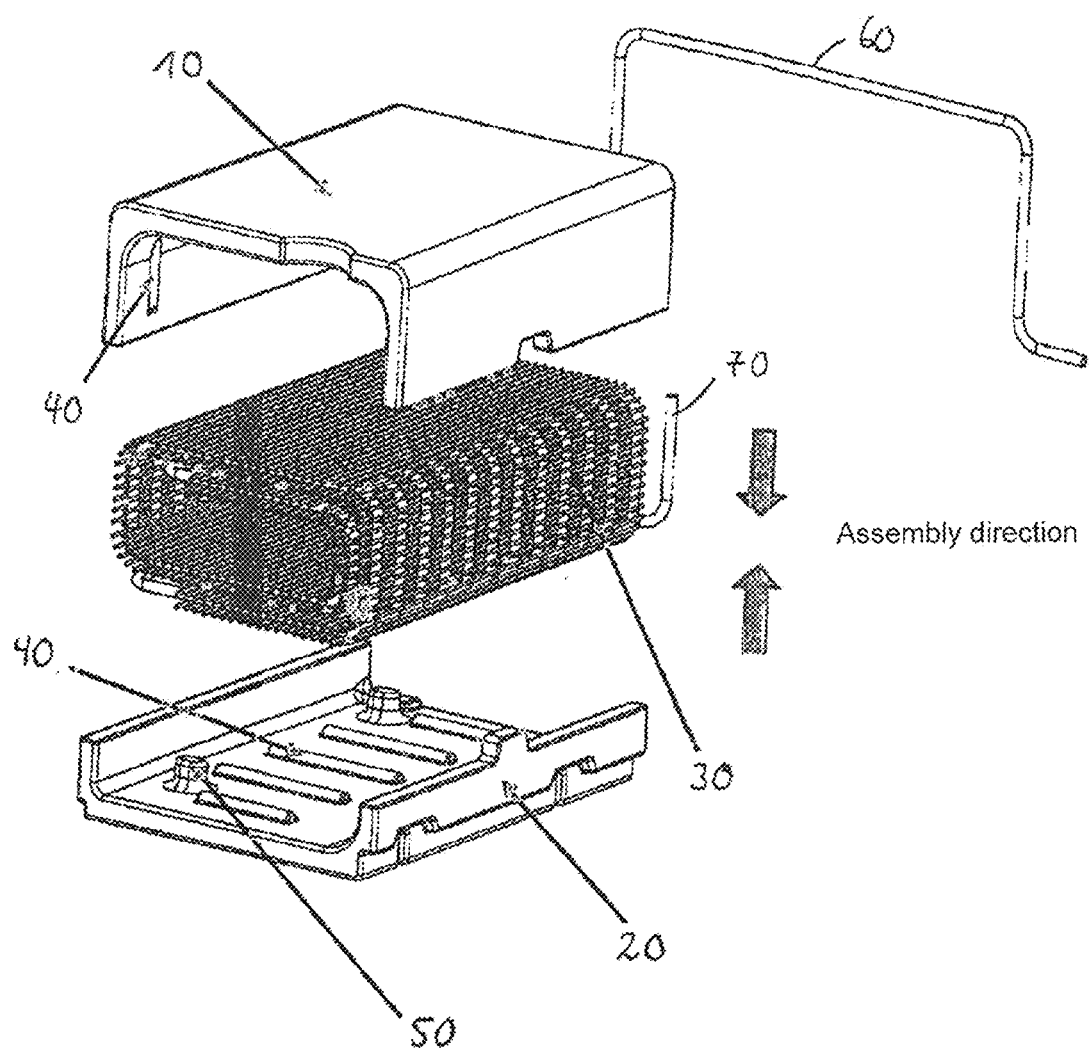

| JP | 2003042635 A | 2/2003 |
| JP | 2003077046 A | 3/2003 |
| JP | 2007003181 A | 1/2007 |

* cited by examiner

Exemplary ventilation

REFRIGERATOR UNIT AND/OR FREEZER UNIT

This application claims priority to German Application No. 10 2012 001 344,2, filed Jan. 24, 2012 and German Application No. 10 2012 003 147.5, filed Feb. 16, 2012, the entireties of which are both hereby incorporated by reference.

The present invention relates to a refrigerator unit and/or freezer unit having at least one refrigerant circuit which has at least one condenser which is connected to at least one damping element which damps vibrations of the condenser and which is arranged between the condenser and at least one part of the unit.

In known refrigerator units and/or freezer units, the refrigerant circuits generally have at least one evaporator, at least one compressor, at least one condenser and at least one restrictor which is connected to the evaporator inlet so that a closed circuit is formed. The refrigerant contained in the evaporator, absorbs heat from the compartment to be cooled. In the downstream compressor, the evaporated refrigerant is compressed and is then supplied to the condenser in which the refrigerant emits heat to the environment. The condensed refrigerant then flows through a capillary flow restrictor and is again supplied to the evaporator after flowing through said capillary flow restrictor.

Due to the fact that the condenser is mounted directly and undamped at a unit region, such as at the rear lips of the side walls of the carcass, at a support plate or at other mounts in the base region or at another site, the vibrations which are generated by the compressor or the compressor strokes are directly transmitted from the condenser, which is connected to the compressor by the refrigerant circuit, to the surrounding parts or to the unit parts which are connected to the condenser. Condensers are thus frequently fixed directly to the unit, e.g. by a screw connection.

To damp this transmission of vibrations from the condenser to other parts of the unit, it is known from the prior art to arrange condensers in a damping manner by means of rubber/TPE parts, with these parts being arranged between the condenser and a unit part such as a support plate. The transmission of vibrations from the condenser is thereby reduced or damped.

It is the underlying object of the present invention to further develop a refrigerator unit, and/or freezer unit of the initially named kind in an advantageous manner.

This object is achieved by a refrigerator unit and/or freezer unit having the features described in the specification. Provision is accordingly made that the condenser is connected to a damping element which is arranged between the condenser and at least one part or region of the unit and which partly or completely consists of or comprises a foamed and/or expanded material.

The expanded material is preferably an expanded plastic or plastic polymer and/or polymer foam, and in particular EPP, i.e. expanded polypropylene, but other expanded materials are also conceivable and are covered by the invention. The foamed material is preferably foam which preferably consists of or comprises polyethylene and/or polypropylene.

EPP is preferably a plastic foam which can be designed in a thermoplastic manner, and primarily with closed cells.

In accordance with a further aspect of the invention, provision is made that the damping element surrounds the condenser at at least two sides and/or in that the damping element forms a flow passage or a part of a flow passage in which the condenser is arranged. The damping element can thus serve as a mount for the condenser and form or bound a flow passage in which the condenser is arranged. The damping element can surround the condenser at one or more sides of the condenser.

In this case, the damping element thus not only serves the damping of vibrations of the condenser, but also additionally forms a flow passage for the throughflow of air or the like by which heat from the condenser can be led away. This damping element preferably consists of the above-named expanded and/or foamed material, preferably of foam and/or of expanded plastic, and in particular of EPP, i.e. of expanded polypropylene, or comprises such a material.

In accordance with a preferred embodiment of the invention, it is thus conceivable that the damping element is arranged at more than one side of the condenser, preferably at two to four sides of the condenser. It is, for example, conceivable that the condenser has two side regions, an upper and a lower side, and that the damping element extends at and/or parallel to these sides of the condenser. In this exemplary case, the front side and the rear side of the condenser are open and, for example, form the inlet opening and the outlet opening for all or for another medium which flows around and/or flows through the condenser.

Provision is made in a further embodiment of the invention that a fan is provided which is arranged such that the condenser can be forced-air cooled by it. The fan is preferably arranged such that air or another medium is conveyed through the flow passage which is formed in part or as a whole by the damping element. The condenser is in this case forced-air cooled.

Provision can furthermore be made that the damping element is made in one or more parts. It can, for example, have an upper part and a lower part between, which the condenser is received. Provision is preferably made in this respect that the damping element surrounds the condenser at four sides. This naturally also applies to a single-part design of the damping element which is likewise covered by the invention.

Provision is made in a further embodiment of the invention that the damping element is configured such that it only partly contacts or fixes or receives the condenser.

This has the advantage that the condenser surface is exposed to a larger part and can be flowed around by a cooling medium such as air. The condenser is exposed to a larger part and can in this respect also be flowed around by air at the side facing the damping element. Provision is thus preferably made that the damping element does not lie over its full area on the surface or on the surfaces of the condenser, but only at parts or partially. Regions thus exist between the damping element and the condenser through which air or another cooling medium can flow, whereby the heat dissipation from the condenser is correspondingly improved.

The damping element can furthermore also have mounts and/or contours which are arranged relative to the condenser such that a displacement or shifting of the condenser relative to the damping element is prevented. In this case, the damping element also serves as a fixing means for the condenser and holds the condenser in a specific position. A comparatively simple assembly of the condenser is thus possible.

Provision is made in a further embodiment of the invention that the material of the damping element has heat-insulating properties so that it at least partially keeps the waste condenser heat away from the regions of the unit adjacent to the damping element.

The damping element preferably has a high temperature resistance, preferably from up to 150° C. or up to 120° C. A condenser can adopt this temperature. This heat-insulating property has the consequence that the components of the unit adjacent to the damping element or to the condenser do not have to satisfy such high demands on the temperature resistance, which has a positive effect with respect to the costs of the parts.

The present invention furthermore relates to the use of a damping element which consists of or comprises in part or in full a foamed and/or expanded material, preferably foam and/or an expanded polymer material or plastic foam, and in particular expanded polypropylene (EPP), for the vibration-damped arrangement of a condenser of a refrigerator unit and/or freezer unit and/or relates to the use of a damping element for the reception of a condenser of a refrigerator unit and/or freezer unit such that the damping element surrounds the condenser at at least two sides and/or forms or bounds a flow channel in which the condenser is arranged. The foam can consist of PE and/or PP, for example, or can comprise one or both of these polymers.

This damping element preferably has the above-named properties.

The invention further relates to a method for installing a condenser of a refrigerator unit and/or freezer unit comprising the steps: placing the condenser into a mount and installing the mount at a unit part or installing the mount at a unit part and placing the condenser into the installed unit part, with the mount being a damping element by means of which vibrations of the condenser can be damped. The damping element preferably has the above-named properties. It is not necessary in this embodiment of the invention as with other usual variants to install the damping elements with a comparatively high effort and/or cost for vibration absorption.

The condenser can, for example, be a wire tube block condenser, spiral condenser or a rolled wire tube condenser or also another type.

The component to which the condenser or the damping element is fixed can, for example, be a part of the carcass of the unit or also a support plate.

The condenser can, for example, be arranged in the base region or in the top region or also in the region of the rear wall of the unit, with a support plate being able to be provided at which the damping element is mounted to the condenser. The damping element and the condenser can thus be components of a base component and/or of a top component, with these units having one or all components of the refrigerant circuit and preferably being installed on one or more support plates.

The damping element is preferably configured such that the condenser cannot output any vibrations or oscillations to the surrounding parts of the unit which are disturbing for the user in that the damping element absorbs these vibrations in part or in full.

Figure 2:
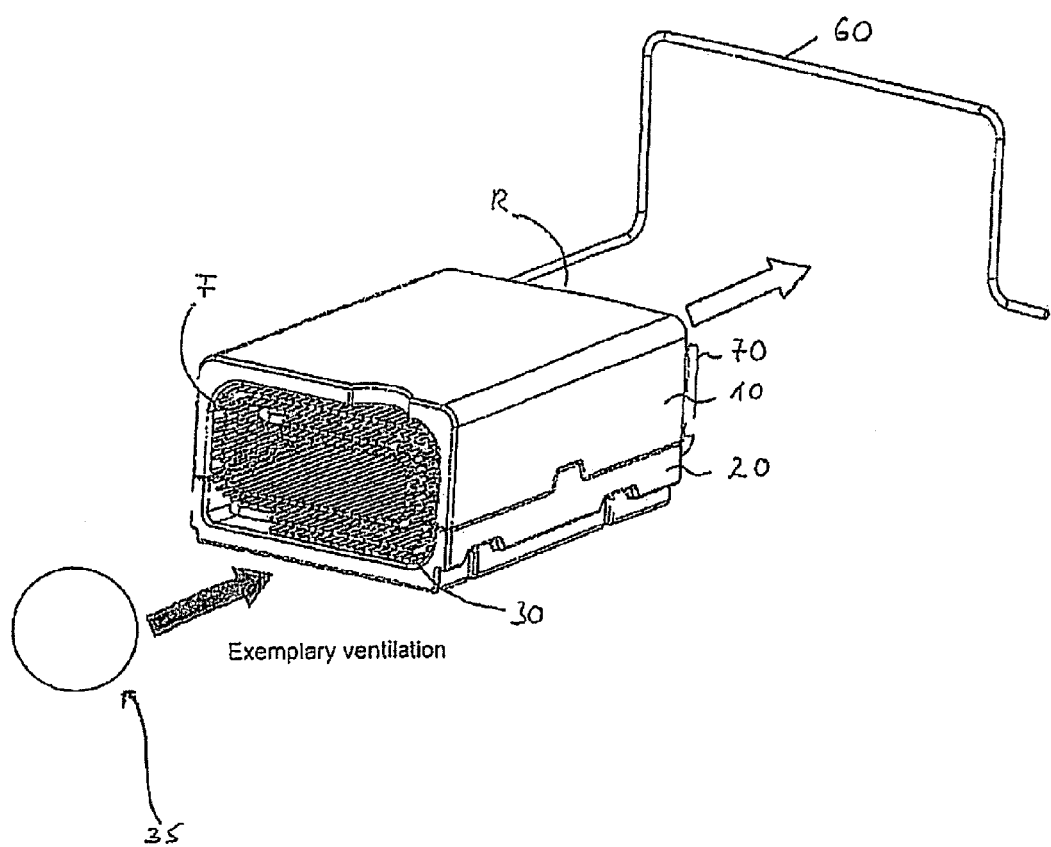
Figure 3:
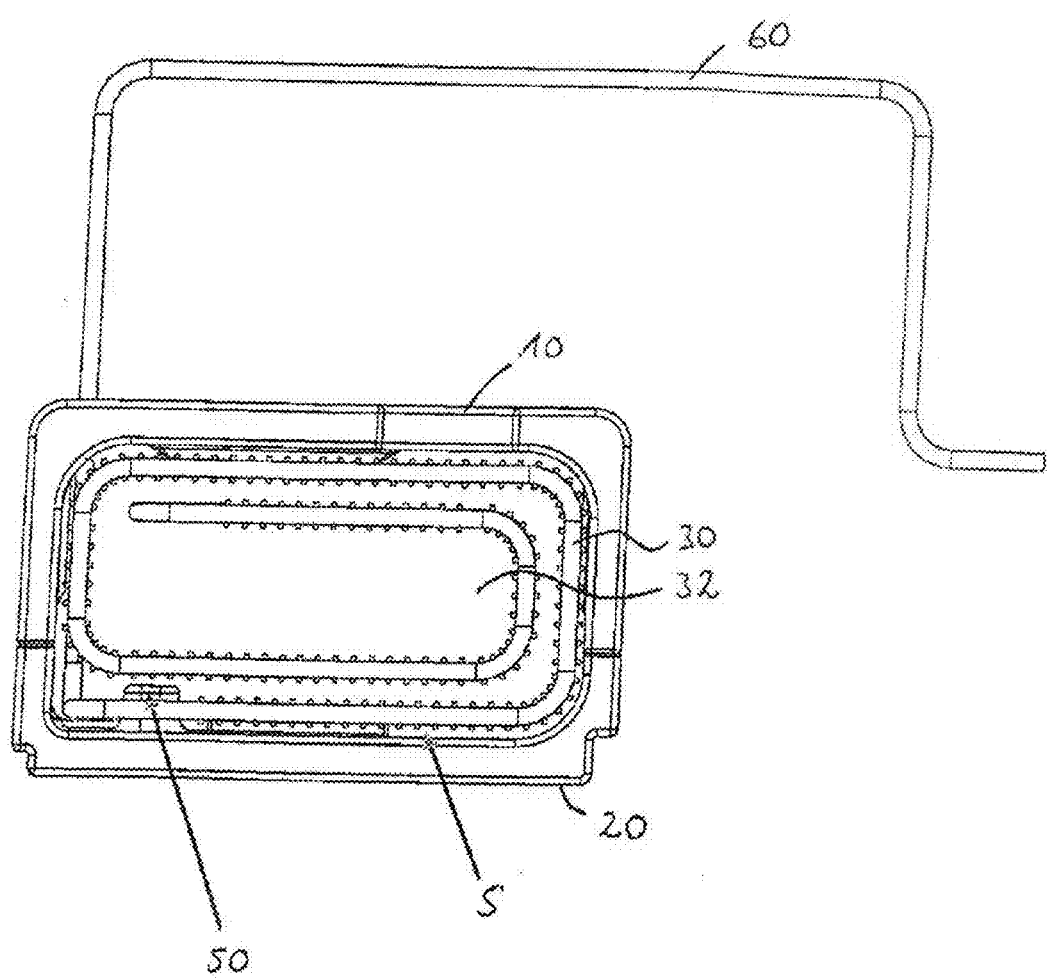
Figure 4:
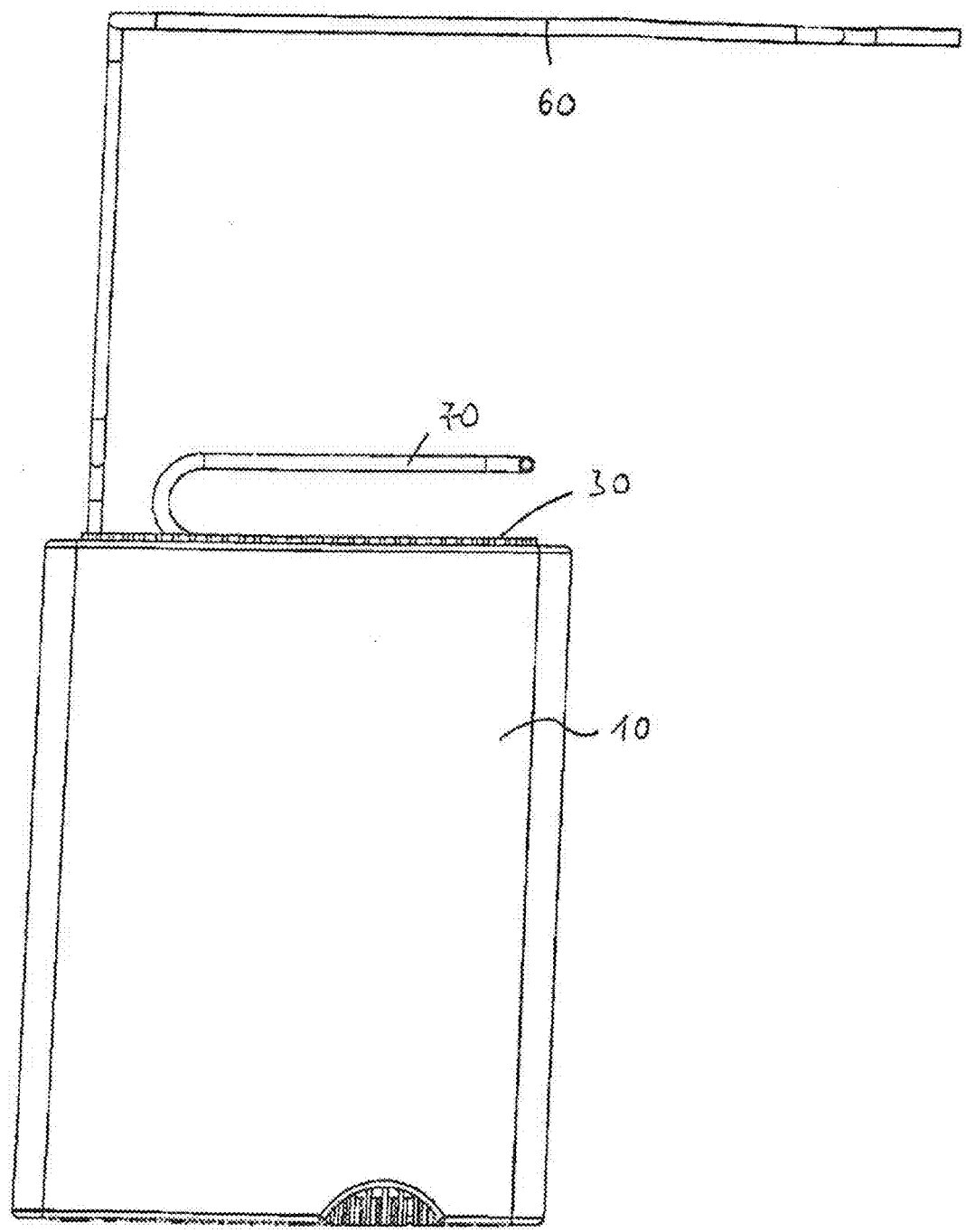

Further details and advantages of the invention will be explained in more detail with reference to an embodiment explained in more detail in the drawing. There are shown:

FIG. 1: an exploded representation of the damping element with condenser;

FIG. 2: a schematic view of the throughflow of the inner space of the damping element with air;

FIG. 3: a front view of the arrangement in accordance with FIG. 2;

FIG. 4: a plan view of the arrangement in accordance with FIG. 2; and

Figure 5:
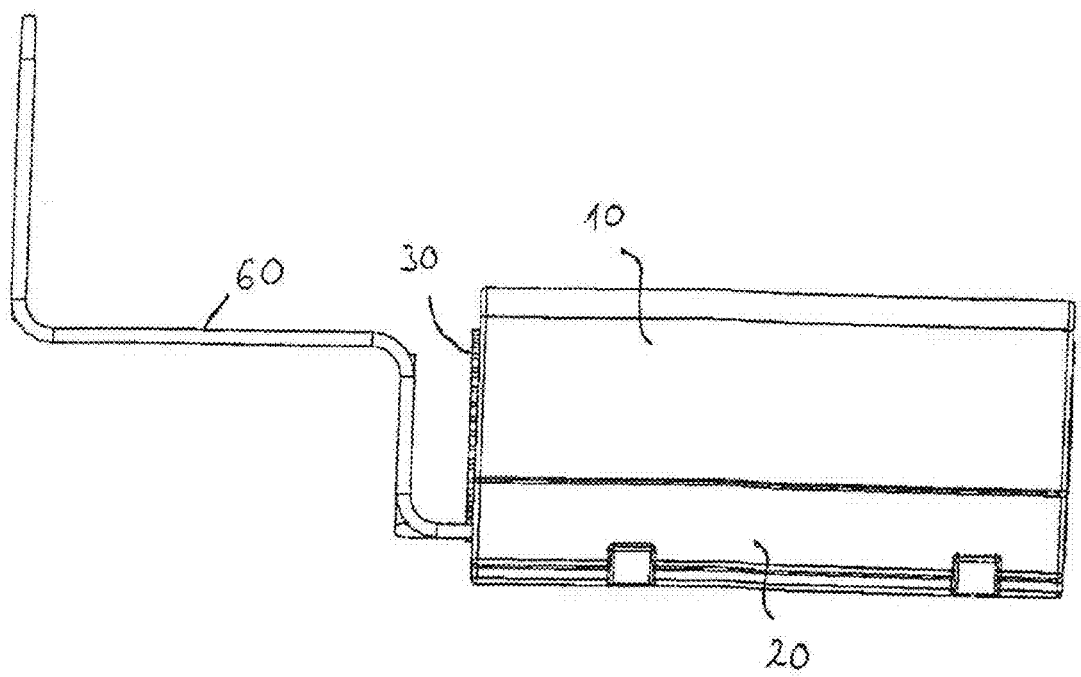

FIG. 5: a front view of the arrangement in accordance with FIG. 2.

FIG. 1 shows an upper part of the damping element in accordance with the invention comprising EPP with the reference numeral 10. The reference numeral 20 designates the lower part of the damping element likewise comprising EPP.

A similarly expanded and/or foamed material can also be considered instead of or in addition to EPP. The use of a foam material is conceivable.

Both parts 10, 20 are designed in U form in cross-section and can be joined so that they bound a space in the assembled state in which the condenser 30 is received. In the assembled state, the perpendicular limbs of the upper part 10 and the lower part 20 stand on one another, such as can be seen from FIG. 2, for example. In this state, the two parts 10, 20 bound a space which is closed except for a front side F visible in FIG. 2 and a rear side R remote therefrom and not visible in FIG. 2. The two parts 10, 20 thus form a flow passage open at its two ends.

The upper part 10 and/or the lower part 20 have clamping ribs 40 at their inner side facing the condenser which extend parallel to the open sides of the damping element. Orientations of the clamping ribs differing therefrom can generally also be considered. The clamping ribs 40 form the contact points between the condenser 30 and the two parts 10, 20 which form the damping element. This means that the outer side of the condenser 30 is not in contact over its full surface with the inner sides of the parts 10, 20, but only with the named elevated clamping ribs 40.

The parts 10, 20 thus only receive the condenser 30 partially or only fix it partially and not over its full area.

This has the advantage that a gap remains between the inner sides of the parts 10, and the outer side of the condenser 30 which is marked by the reference symbol S in FIG. 3. This gap which is free at all sides allows a flowing around or a flowing through of the region between the damping element 10, 20 and the outer side of the condenser 30.

In addition, the condenser is flowed through in its inner region 32. The air flow indicated by arrows, for example, in FIG. 2 (forced ventilation) is generated by a fan 35 (shown schematically) which can be arranged before or after the condenser 30 and can likewise form a component of a base component or top component of the unit.

The condenser 30, which can be designed, for example, as a wire tube block condenser, is dimensioned such that it can be received or is received in the reception space of the damping element. This results, for example, from FIGS. 3 to 5.

A holding structure marked by the reference numeral 30 can furthermore be seen from FIGS. 1 and 3 which extends from the inner side of the upper part 10 and/or of the lower part 20.

This holding structure extends in the condenser such that a displacement of the condenser 30 relative to the upper part 10 or the lower part 20 is precluded.

The holding structures 50 are configured as circular projections, but can also have a different shape.

The named clamping elements 40 and/or the holding structures 50 can be configured in one piece with the upper part or lower part 10, 20 or can also be designed as separate parts which are connected to the parts 10, 20.

The condenser 30 is connected to a line section 60 leading from the compressor, not shown, and to a line section 70 leading to the evaporator or to the capillary flow restrictor upstream thereof, such as can be seen from FIG. 4, for example. Both line sections 60, 70 extend from the same side of the condenser 30. The compressor is preferably likewise a part of a base component or of a top component.

It can be seen from FIGS. 2 to 5 that the damping element extends over its full surface, with the exception of the front side and rear side, around the condenser 30, with the condenser being received completely in the space surrounded by the parts 10, 20 and that only two opposite sides, namely the front side F and the rear side R, are open. They serve the inlet or outlet of air which is conducted by means of a blower through the mount of the damping element and thus over the tube lines and cooling elements of the condenser 30.

The assembly in production is simplified by the design of the parts 10, 20 favorable from a shape aspect. It is not necessary as with other usual variants of the vibration absorption (usually rubber/IPE parts) to mount them with an increased effort and/or cost.

The EPP material or the PE and or PP foam material has a high temperature resistance, which brings along the advantage that parts adjacent to the damping element such as parts of the carcass, of a support plate, etc., do not have to satisfy any very high demands with respect to the temperature resistance, whereby comparatively inexpensive materials can be used.

It is preferred to arrange the arrangement shown of damping element and condenser in the base region, i.e. in the lower region or in the top region, i.e. in the upper region of a refrigerator unit and/or freezer unit. Not only vibrations of the condenser are damped or fully absorbed by the damping element, but it also serves as a mount for the condenser. The condenser is thus preferably not directly in contact with other parts of the unit, but only indirectly via the named damping element.

The invention claimed is:

1. A refrigerator unit and/or freezer unit with at least one refrigerant circuit which comprises
    at least one condenser and
    at least one damping element which is arranged between the condenser and at least one part of the unit,
    wherein the damping element surrounds the condenser at at least two sides,
    the damping element forms a flow passage in which the condenser is arranged, and
    the damping element is arranged such that the damping element defines an inlet opening and an outlet opening through which air flows to the condenser or away from the condenser,
    wherein
    the at least one condenser is connected to the at least one damping element,
    the least one damping element damps vibrations of the condenser,
    the damping element is configured to only partly contact the condenser, so that a gap remains between an inner side of the damping element and an outer side of the condenser, and
    the gap defines a flow path between the inner side of the damping element and the outer side of the condenser which connects the inlet opening and the outlet opening without entering the condenser.

2. A refrigerator unit and/or freezer unit in accordance with claim 1, wherein the damping element is arranged at more than one side of the condenser and/or the damping element is arranged such that it defines an inlet opening and an outlet opening through which air flows to the condenser or away from it.

3. A refrigerator unit and/or freezer unit having at least one coolant circuit according to claim 2, wherein the damping element is arranged at two to four sides of the condenser.

4. A refrigerator unit and/or freezer unit in accordance with claim 1, wherein a fan is provided which is arranged relative to the condenser such that the condenser is flowed around and/or flowed through by air or another medium conveyed by means of the fan in the operation of the fan.

5. A refrigerator unit and/or freezer unit in accordance with claim 1, wherein the damping element is configured in one part or in multiple parts and/or has an upper part and a lower part which bound a space in which the condenser is located.

6. A refrigerator unit and/or freezer unit in accordance with claim 1, wherein the damping element is configured such that it only contacts or fixes or receives the condenser in part and not over its full surface; and/or in that the damping element has one or more mounts and/or contours which are arranged such that a displacement or shift of the condenser relative to the damping element is prevented.

7. A refrigerator unit and/or freezer unit in accordance with claim 1, wherein the material of the damping element has heat-insulating properties at least regionally so that it keeps the waste condenser heat away from the adjacent regions of the unit at least in part.

8. A refrigerator unit and/or freezer unit with at least one refrigerant circuit in accordance with claim 1, wherein the damping element comprises in part or in full a foamed and/or expanded material.

9. A refrigerator unit and/or freezer unit with at least one refrigerant circuit in accordance with claim 8, wherein the foamed material is polypropylene or polyethylene.

10. A refrigerator unit and/or freezer unit with at least one refrigerant circuit in accordance with claim 8, wherein the expanded polymer material is expanded polypropylene (EPP).

11. A method of installing a condenser of a refrigerator unit and/or freezer unit comprising the steps: placing the condenser into a mount bounding the condenser at at least two sides and installing the mount at a unit part or installing the mount at a unit part and placing the condenser into the installed unit part, with the mount being a damping element by means of which vibrations of the condenser are damped, the damping element being arranged to define an inlet opening and an outlet opening through which air flows to the condenser or away from the condenser, wherein the condenser is connected to the one damping element and the damping element is configured to only partly contact the condenser so that a gap remains between an inner side of the damping element and an outer side of the condenser, the gap defining a flow path between the inner side of the damping element and the outer side of the condenser which connects the inlet opening and the outlet opening.

* * * * *